United States Patent
Eskicioglu et al.

(10) Patent No.: US 7,664,268 B1
(45) Date of Patent: Feb. 16, 2010

(54) CONDITIONAL ACCESS SYSTEM FOR DIGITAL RECEIVERS

(75) Inventors: Ahmet Mursit Eskicioglu, Indianapolis, IN (US); Mehmet Kemal Ozkan, Istanbul (TR); Billy Wesley Beyers, Jr., Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/581,064

(22) PCT Filed: Dec. 9, 1998

(86) PCT No.: PCT/US98/26069

§ 371 (c)(1),
(2), (4) Date: Oct. 7, 2002

(87) PCT Pub. No.: WO99/30498

PCT Pub. Date: Jun. 17, 1999

(51) Int. Cl.
*H04L 9/08* (2006.01)

(52) U.S. Cl. .................. 380/278; 380/286; 380/200; 380/201; 713/193; 726/26

(58) Field of Classification Search ............... 380/286, 380/200–202, 44–47, 28–30, 210, 211, 228, 380/278; 713/185, 182, 192, 193; 726/26–33; 725/28–31; 705/50, 51, 52, 57, 59
See application file for complete search history.

(56) References Cited

U.S. PATENT DOCUMENTS

| | | | | |
|---|---|---|---|---|
| 4,634,808 A | * | 1/1987 | Moerder | 380/29 |
| 4,736,422 A | | 4/1988 | Mason | 380/20 |
| 4,751,732 A | * | 6/1988 | Kamitake | 380/230 |
| 4,802,215 A | | 1/1989 | Mason | 380/21 |
| 5,103,479 A | * | 4/1992 | Takaragi et al. | 380/28 |
| 5,117,458 A | * | 5/1992 | Takaragi et al. | 380/228 |
| 5,351,294 A | * | 9/1994 | Matsumoto et al. | 380/228 |
| 5,590,200 A | | 12/1996 | Nachman et al. | |
| 5,627,893 A | * | 5/1997 | Demytko | 380/30 |
| 5,737,424 A | * | 4/1998 | Elteto et al. | 380/28 |
| 5,737,425 A | * | 4/1998 | Ajtai | 380/30 |
| 5,790,666 A | | 8/1998 | Ooi | |
| 6,035,037 A | * | 3/2000 | Chaney | 380/227 |

(Continued)

FOREIGN PATENT DOCUMENTS

EP 658054 6/1995

(Continued)

OTHER PUBLICATIONS

Santis, How to share a function securely, 1994, ACM, pp. 522-533.*

(Continued)

*Primary Examiner*—Kimyen Vu
*Assistant Examiner*—Nirav Patel
(74) *Attorney, Agent, or Firm*—Robert D. Shedd; Paul P. Kiel

(57) ABSTRACT

A method for providing conditional access (i.e., managing access) to a received scrambled audio/visual (A/V) signal from a variety of sources by utilizing secret sharing for key recovery. Secret sharing eliminates the necessity to protect and transfer the complete descrambling keys between devices, because a portion of the key is stored in the device or a smart card coupled thereto.

4 Claims, 2 Drawing Sheets

U.S. PATENT DOCUMENTS

| | | | |
|---|---|---|---|
| 6,049,873 | A | 4/2000 | Kaku et al. |
| 6,760,445 | B1 * | 7/2004 | Schwenk et al. ............ 380/278 |

FOREIGN PATENT DOCUMENTS

| | | |
|---|---|---|
| EP | 714024 | 5/1996 |
| JP | 62180625 A | 7/1987 |
| JP | 7288522 A | 10/1995 |
| JP | 8195735 A | 7/1996 |
| JP | 9181689 A | 7/1997 |
| WO | WO97/07481 | 2/1997 |

OTHER PUBLICATIONS

Shamir, How to Share a Secret, 1979, Communications of the ACM, vol. 22, pp. 612-613.*

Chen, Liqun, et al., "Secret Sharing with Reusable Polynomials," Lecture Notes in Computer Science, vol. 1270, p. 184-193, Information Security and Privacy, Jul. 23, 1997.

Japan Business Machine Industries Assn, JBMIA Committee for ISO Standards, Story and Summary of International Standardization on Office Machine (3), "Business and Management," vol. 42, No. 524, p. 96-101, NOMA Research Institute, Inc., Japan, Feb. 1, 1990.

Koyano, Yukio. "Future Industry Research Corner (87), Movement of Consortium Relating to Standardization-Exemplified by IC Card and PC Card," Technique and Economy, JapanTechno-Economics Society, Serial vol. 332, p. 72-77, Oct. 5, 1994.

"Functional Model of Conditional Access System" EBU Project Group B/CA Published by the European Broadcasting Union Case postale 678, CH-1218 Grand-Saconnex, Geneva, Switzerland, 1995.

Chambers WG: "Solution of Welch-Berlekamp Key Equation by Euclidean Algorithm" Electronic Letters, vol. 29, No. 11, May 27, 1993, p. 1031.

Guillou LC et al: "Encipherment and Conditional Access" SMPTE Journal, vol. 103, No. 6, Jun. 1, 1994, pp. 398-406.

Engelkamp H: "Hard—Und Software Der Set-Top-Boxen" Radio Fernsehen Elektronik, vol. 45, No. 8, Aug. 1996, pp. 20-23 Translation Attached.

European Search Report Dated Feb. 10, 1999.

* cited by examiner

CONDITIONAL ACCESS SYSTEM FOR DIGITAL RECEIVERS

FIELD OF THE INVENTION

This invention concerns a system for providing conditional access (i.e., managing access) to a received scrambled audio/visual (A/V) signal from a variety of sources, such as, broadcast television networks, cable television networks, digital satellite systems, and internet service providers. Utilizing the concept of secret sharing, the system does not require full descrambling keys to be sent to the receiving device under encryption. The keys are recovered using a seed value received from the service provider and a seed value stored in the device.

BACKGROUND OF THE INVENTION

Today, a user may receive services from a variety of service providers, such as broadcast television networks, cable television networks, digital satellite systems, and internet service providers. Most television receivers are capable of receiving unscrambled information or programs directly from broadcast and cable networks. Cable networks providing scrambled (or encrypted) programs usually require a separate stand alone set-top box to descramble (or decrypt) the program. Similarly, digital satellite systems usually provide scrambled programs that also require the use of a separate set-top box. These set-top boxes may utilize a removable smart card which contain the keys necessary for recovering the scrambling or descrambling keys. Protection of these important keys is paramount to prevent unauthorized copying of the programming.

European Patent Application Number EP-A-0 658 054 discloses generating a descrambling key using two places of transmitted data.

SUMMARY OF THE INVENTION

In a conditional access (CA) system, the signals are usually scrambled using symmetric ciphers such as the Data Encryption Standard (DES). For security reasons, the scrambling key is changed frequently, the period of change being as frequent as every few seconds. The protection of the descrambling keys, which need to be sent with the signals, is often provided by public-key cryptography. Public-key cryptography introduces problems associated with the public key infrastructure and distribution of the keys. This invention resides, in part, in recognition of the described problem and, in part, in providing a solution to the problem.

A signal (e.g., an event or program) as described herein comprises information such as (1) audio/visual data (for example, a movie, weekly "television" show or a documentary); (2) textual data (for example, an electronic magazine, paper, or weather news); (3) computer software; (4) binary data (for example, images); (5) HTML data (for example, web pages); or any other information for which access control may be involved. The service providers include any provider broadcasting events, for example, traditional broadcast television networks, cable networks, digital satellite networks, providers of electronic list of events, such as electronic program guide providers, and in certain cases internet service providers.

Generally, the present invention defines a method for managing access to a signal, representative of an event of a service provider, utilizing a smart card. That is, this method comprises receiving in a smart card, a signal that is scrambled using a scrambling key, receiving data representative of a first seed value, generating the scrambling key using the first seed value and a second seed value that is stored in the smart card and descrambling the signal using the generated scrambling key to provide a descrambled signal.

In accordance with one aspect of the present invention, the first and second seed values are points on a Euclidean plane and the step of generating the scrambling key comprises calculating the Y-intercept of the line formed on the Euclidean plane by the first and second seed values.

In accordance with still another aspect of the present invention, a system for managing access between a service provider and a device having a smart card coupled to the device involves the device performing the steps of receiving from the service provider a signal representative of an event that is scrambled using a scrambling key, receiving from the service provider data representative of a first seed value selected from a Euclidean plane, and coupling the scrambled signal and the first seed value to the smart card. The smart card has a means for access control processing comprising means for generating a scrambling key by calculating the Y-intercept of the line formed in the Euclidean plane by the first seed value and a second seed value stored in the smart card and means for descrambling the signal using the generated scrambling key to generate a descrambled signal.

These and other aspects of the invention will be explained with reference to a preferred embodiment of the invention shown in the accompanying Drawings.

BRIEF DESCRIPTION OF THE DRAWING

FIG. 3b is a graphical representation of an allocation of a unique and non-overlapping range for each service provider in accordance with FIG. 3a.

DETAILED DESCRIPTION OF THE DRAWING

The present invention provides a conditional access system which may be utilized to obtain services from one of a plurality of sources. The conditional access system when implemented within a device, such as a digital television, digital video cassette recorder or set-top box, provides convenient management of the descrambling keys because only a portion of the seed value necessary for key generation is stored therein. For simplicity, the below description of the invention will be directed towards an implementation using a digital television and a smart card.

Figure 1:
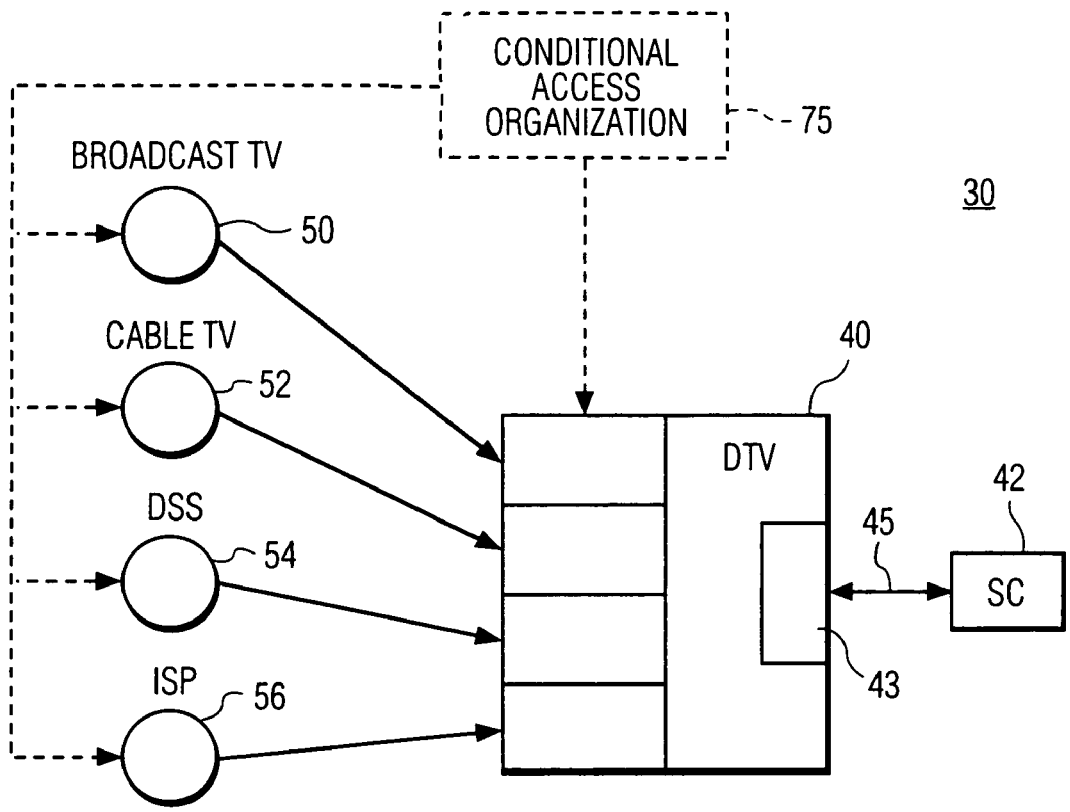
FIG. 1 is a block diagram illustrating one architecture for interfacing a common set-top box to a variety of service providers.

In FIG. 1, system 30 depicts the general architecture for managing access to a digital television (DTV) 40. Smart Card (SC) 42 is inserted into, or coupled to, a smart card reader 43 of DTV 40; an internal bus 45 interconnects DTV 40 and SC 42 thereby permitting the transfer of data therebetween. Such smart cards include ISO 7816 cards having a card body with a plurality of terminals arranged on a surface in compliance with National Renewable Security Standard (NRSS) Part A or PCMCIA cards complying with NRSS Part B. Conceptually, when such a smart card is coupled to a smart card reader, the functionality of the smart card may be considered to be a part of the functionality of the device (e.g., DTV 40) thus removing the "boundaries" created by the physical card body of the smart card.

DTV 40 can receive services from a plurality of service providers (SPs), such as a broadcast television SP 50, a cable television SP 52, a satellite system SP 54, and an internet SP 56. Conditional Access Organization (CA) 75 is not directly connected to either the service providers or STB 40 but deals with key management and issues public and private key pairs which may be used, if necessary, as explained below.

The present invention employs the concept of secret sharing which eliminates the requirement for using public key cryptography to ensure secure transmission of the audio/visual (A/V) stream from a service provider. A variation of a secret sharing scheme, developed by Adi Shamir, is known as a threshold scheme. An (m, n) threshold scheme involves breaking a secret into n pieces (which may be called shadows), in such a way that at least m (<=n) of the pieces are required to reconstruct the secret. A perfect threshold scheme is a threshold scheme in which a knowledge of m-1 or fewer shadows provides no information about the secret. For example, with a (3,4)-threshold scheme, the secret is divided into four portions but only three of the four portions are required to reconstruct the secret. Two of the portions, however, cannot reconstruct the secret. In Shamir's (m, m) threshold scheme, choosing a higher value for m, and storing (m-1) secrets in the card would increase the system's resistance to ciphertext only attacks, but would lead to more computations for polynomial construction.

Such a threshold scheme reduces the computational requirements for the card in DES key recovery. For each new key, only a simple operation is performed (i.e., the value of the polynomial at x=0 is computed) as compared to RSA decryption which involves modular exponentiation. Additionally, security is "perfect" (i.e., given knowledge of $(x_1, y_1)$, all values of the secret remain equally probable).

Figure 2:
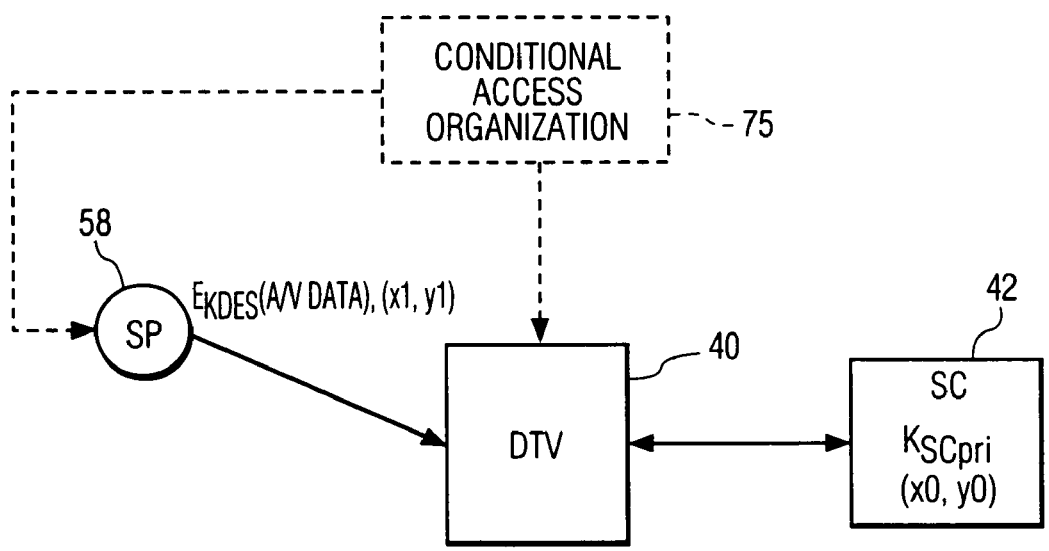
FIG. 2 is a block diagram of an exemplary implementation of a system for managing access to a device in accordance with the invention.

FIGS. 2 and 3 together, demonstrate one embodiment of the present invention. Particularly, stored in SC 42 is a first seed value (or data point). The first seed value may be thought of as a single point on a Euclidean plane, i.e., in the form of (x0, y0). Service provider 58 transmits a signal (or event or program) that may be scrambled by a symmetric key, for example a Data Encryption Standard (DES) key. In addition to the scrambled signal, service provider 58 transmits a second seed value. Similarly, the second seed value may be a second single point from the same Euclidean plane, i.e., in the form of (x1, y1).

The scrambled A/V signal and the second seed value is received by DTV 40 and is coupled to SC 42 for processing. SC 42 receives the second seed value and utilizes both the stored first seed value and the received second seed value to reconstruct (or recover) the symmetric key. SC 42 uses the reconstructed symmetric key to descramble the received scrambled A/V signal and generate a descrambled A/V signal. This descrambled A/V signal is provided to DTV 40 for display.

Figure 3A:
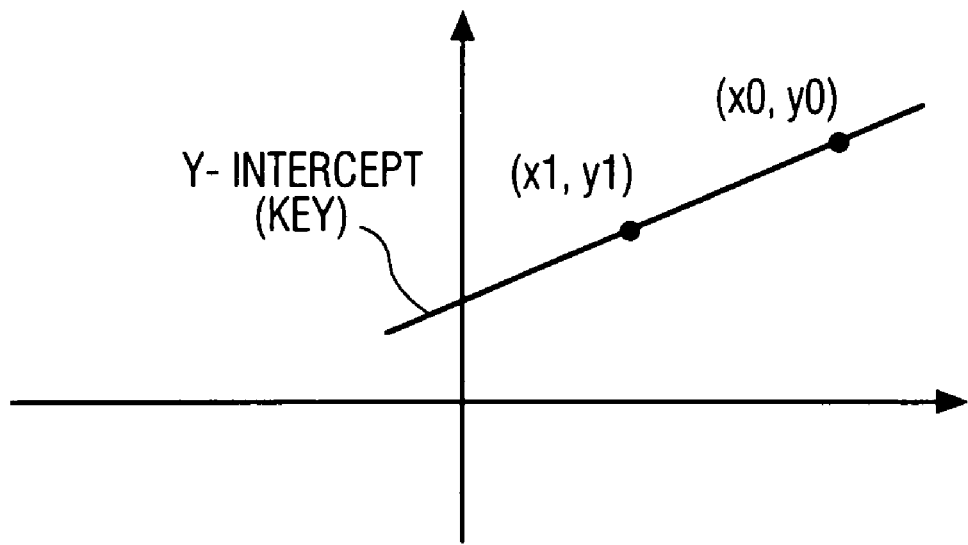
FIG. 3a is a graphical representation of the determination of the scrambling key in accordance with one embodiment of this invention.
Figure 3B:
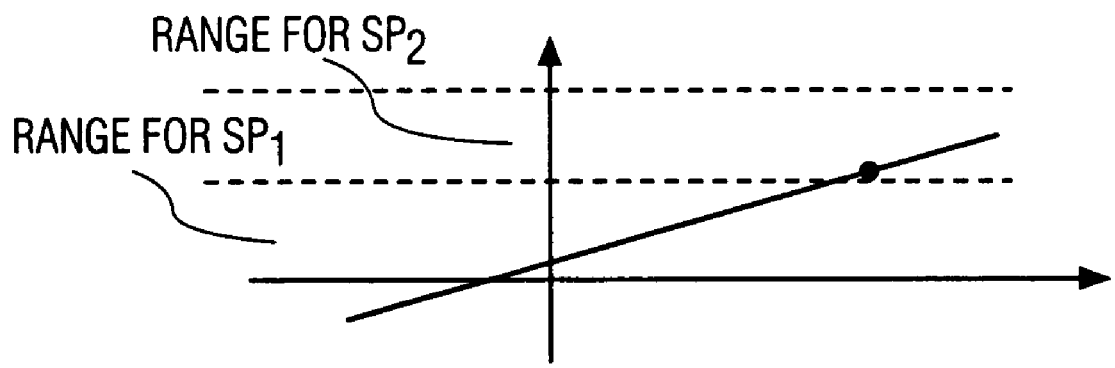

Recovery of the symmetric key is achieved by constructing a polynomial utilizing the first and the second seed values; the y-intercept of the constructed polynomial is the symmetric key. For example, given (x0, y0) and (x1, y1), the symmetric key is constructed by computing the value of $[\{(y1-y0)/(x1-x0)\}(x-x0)]+y0$ at x=0. FIG. 3a illustrates a graphical representation of the present invention.

Such an approach permits more than one service provider to share the stored second seed value (x0, y0). Each service provider would then be free to choose its own first seed value. The probability of constructing polynomials with identical y-intercepts (i.e., identical symmetric keys) is low. However, the range of possible second seed values could be allocated such that each service provider has a unique and non-overlapping range (see FIG. 3b). Further, it is within the scope of the present invention that each service provider could choose its own first seed value which could be encrypted using the public key of the smart card before downloading. The seed value would be recovered by the smart card using its stored private key ($K_{SCpri}$).

The general architecture of system 30 lends itself to achieving the goal of minimizing the amount of information (or keys) that needs to be stored in a smart card to permit access to more than one service provider.

The robustness of the defined system may be increased by scrambling portions of the event with different keys and transmitting different second seed values. Further, it is within the scope of the present invention that more than two seed values may be used to recover the symmetric key. For example, two or more seed value may be stored in the smart card and a seed value may be transmitted with the encrypted A/V signal. The symmetric key would be recovered using all of the seed values.

While the invention has been described in detail with respect to numerous embodiments thereof, it will be apparent that upon reading and understanding of the foregoing, numerous alterations to the described embodiment will occur to those skilled in the art and it is intended to include such alterations within the scope of the appended claims.

What is claimed is:

1. A method for managing access to a signal representative of an event of a service provider, said method comprising:
   (a) receiving said signal in a smart card, said signal being scrambled using a scrambling key;
   (b) receiving, in said smart card, data representative of a first seed value, the first seed value representing a first point in a coordinate system;
   (c) generating, in said smart card, said scrambling key using said first seed value and a second seed value in a predetermined function, the second seed value representing a second point in the coordinate system, whereby secret sharing is implemented, said second seed value being permanently stored in said smart card, wherein said first and second seed values are points on a Euclidean plane; and
   (d) descrambling, in said smart card said signal using said generated scrambling key to provide a descrambled signal,
      wherein the step of generating said scrambling key comprises calculating the Y-intercept of a line formed on said Euclidean plane by said first and second seed values.

2. The method of claim 1 wherein said smart card has a card body having a plurality of terminals arranged on a surface of said card body in accordance with one of ISO 7816 and PCMCIA card standards.

3. The method of claim 1 wherein the line is a polynomial and further comprising constructing the line using the first and second seed values.

4. The method of claim 1 further comprising allocating a unique and non-overlapping range of first seed values for the service provider.

* * * * *